United States Patent [19]

Reinking et al.

[11] Patent Number: 4,665,156

[45] Date of Patent: May 12, 1987

[54] MONO- AND BIAXIALLY DRAWABLE FILM OF POLYPHENYLENE SULPHIDE

[75] Inventors: Klaus Reinking, Wermelskirchen; Karsten Idel, Krefeld; Edgar Ostlinning, Duesseldorf, all of Fed. Rep. of Germany

[73] Assignee: Bayer Aktiengesellschaft, Leverkusen, Fed. Rep. of Germany

[21] Appl. No.: 761,367

[22] Filed: Aug. 1, 1985

[30] Foreign Application Priority Data

Aug. 7, 1984 [DE] Fed. Rep. of Germany ....... 3428986
Aug. 7, 1984 [DE] Fed. Rep. of Germany ....... 3428985
Aug. 7, 1984 [DE] Fed. Rep. of Germany ....... 3428984
Jul. 20, 1985 [DE] Fed. Rep. of Germany ....... 3526065

[51] Int. Cl.$^4$ ............................................. C08G 75/16

[52] U.S. Cl. ................................. 528/388; 264/290.2; 428/419

[58] Field of Search .......................................... 528/388

[56] References Cited

U.S. PATENT DOCUMENTS 4,102,954  7/1978  Coale .................................. 528/388
4,286,018  8/1981  Asakura et al. ..................... 528/388

FOREIGN PATENT DOCUMENTS 0205733  11/1983  Japan .

Primary Examiner—Harold D. Anderson
Attorney, Agent, or Firm—Connolly & Hutz

[57] ABSTRACT

The invention relates to mono- and biaxially drawable films of a specific polyphenylene sulphide.

4 Claims, No Drawings

MONO- AND BIAXIALLY DRAWABLE FILM OF POLYPHENYLENE SULPHIDE

The invention relates to mono- and biaxially drawable films of a specific polyphenylene sulphide.

Films of polyphenylene sulphide are known for example from DE-OS (German Offenlegungsschrift) No. 3,107,562, DE-OS No. 2,916,841, U.S. Pat. No. 4,102,954, U.S. Pat. No. 4,251,575, JP Nos. 597 020, 58 201 617, 58 208 019, 58 205 733, 58 067 733, 57 187 327, 56 062 126, 57 205 119, 56 062 128, 56 062 127, 57 205 118, 56 034 426, 56 062 121, 55 034 967 and 57 121 052.

These films are produced by mono- and biaxially drawing previously extruded non-drawn films, the melts being rapidly cooled on cooled rollers or in liquid cooling media to ensure that amorphous films are primarily obtained. The drawing is carried out at temperatures between 80° and 150° C. Thermofixation then follows the drawing step, i.e. the drawn films are subjected, while still under tension, to a single—or multi-stage heat treatment during which they are, if appropriate, heated to the melting temperature of the polyarylene sulphide. The aim of the thermofixation is to prevent shrinkage of the relaxed films upon subsequent subjection to heat.

Using this method it is indeed possible to reduce this shrinkage (heat shrinkage) to values below 1%. The films known so far do, however, only exhibit limited strengths and, in addition, may still be irreversibly deformed under mechanical stress, i.e. their deformation under the maximum possible tension is still very high.

The reason for this behaviour is that, under the above-mentioned conditions, the drawing process does not lead to an increase in the strength of the films. This can only be expected if the drawing is carried out under conditions under which a yield point appears in the tensile stress/elongation diagram. This only occurs at temperatures below the glass transition temperature of the polymer. A yield point can no longer be detected in the tensile stress/elongation diagram at temperatures higher than the glass transition temperature of the polymer.

As far as films of polyphenylene sulphide are concerned this means that the drawing has to be carried out at temperatures below 80°–90° C. in order to finally obtain mono- or biaxially drawn films of maximum strength.

The known films of polyarylene sulphides cannot however be drawn at temperatures below this temperature without tearing during the drawing process.

It has now been found that films of a polyphenylene sulphide which has a weight average of the relative molecular weight $M_w(rel)$ of 25,000 to 500,000 and a melt viscosity $\eta_m$ which fulfil specific conditions, have distinctly more advantageous properties.

The invention thus relates to films of polyarylene sulphides, characterised in that a polyarylene sulphide with a melt viscosity $\eta_m$ of 20 to 5000 Pa.s and a weight average of the relative molecular weight $M_w(rel)$ of 25,000 to 500,000 is used, which has a melt viscosity $\eta_m$ and a weight average of the relative molecular weight $M_w$ which are as follows:

$$\lg \eta_m = 3.48 \cdot \lg M_w(rel) - 14.25 + 0.1,$$

and preferably the $\eta_m$ and $M_w$ are as follows:
$$\lg \eta_m = 3.48 \cdot \lg M_w(rel) - 14.25 + 0.05.$$

The particular advantage of the polyarylene sulphides suitable according to the invention is therefore that they allow the production of films which can be drawn mono- and biaxially below the glass transition temperature. It is thus possible to produce films from the polyarylene sulphides according to the invention by mono- and biaxial drawing, which films have superior mechanical strength and hardly become further deformed even at their maximum mechanical load-bearing capacity.

This properly is of essential importance for the primary uses of the polyarylene sulphide films according to the invention, for example as sheetings for electrical insulation, carrier films for magnetic recording materials or flexible printed circuits.

The mono- and biaxially drawn films of the suitable polyarylene sulphides, according to the inventions are therefore, characterised by the fact that the mono- and biaxial drawing is carried out at temperatures below the glass transition temperatures.

The polyarylene sulphides used for producing the films according to the invention can be produced for example by the processes described in DE-OS Nos. 3,428,984, 3,428,986 and 3,428,985.

A selection of a number of methods is available for determining which polyarylene sulphides can be processed into the films according to the invention.

Polyarylene sulphides can, for example, be analysed by means of chromatographic methods in order to obtain data concerning molecular weight and molecular weight distribution. For this purpose high pressure liquid chromatography (HPLC) or gel permeation chromatography (GPC) are suitable.

Customary supporting materials can be used as the stationary phase, for example, Li-Chroprep ®, Lobar ®, LiChrosorb ®, LiCHospher ®, Perisorb ®, Hibar ®, Fractogel ®, Fractosil ®, Ultrastyragel ®, Microstyragel ®, Zorbax ®, Bondagel ® and Shodex ®.

Customary solvents can be used as the solvents and mobile solvents. They should dissolve the polymer to an adequate extent.

1-Chloronaphthalene, diphenyl, N-methylpyrrolidone, N-cyclohexylpyrrolidone, N-methylpiperidone, N-methylcaprolactam, N-methyllauryllactam, sulpholane, N,N'-dimethylimidazolidinone, N,N'-dimethylpiperazinone, hexamethylphosphoric acid triamide, 1-methyl-1-oxa-phospholane and mixtures thereof are for example suitable.

Absolute or relative calibrations can be carried out in the chromatographic analytical methods. Customary polymers, such as, for example, polystyrene, polyethylene, polyethylene terephthalate, polybutylene terephthalate, polyesters, such as purely aromatic polyesters, polycarbonate, polyamides, such as PA 6, PA 66, PA 11, polysulphones or polyether sulphones are for example suitable as calibration substances for relative calibrations.

The chromatography for the analytical determination of the molecular weights, or molecular weight distribution can be carried out at various pressure of from 1 to 10 bars.

The chromatographic determination is carried out at a temperature of from room temperature to 250° C.

Furthermore substances such as alkali metal halides, alkaline earth metal carboxylates, or phosphonium or ammonium compounds can be added to improve the accuracy of the measurement of the sample to be analysed.

In evaluating the analytical data thus obtained the weight-averaged molecular weights $M_w$ can be obtained. These are 25,000 to 500,000, especially 25,000 to 380,000, preferably 25,000 to 300,000 and particularly preferably The method of procedure described, for example, in DE-OS No. 3,428,984 (addition of amino acids), DE-OS No. 3,428,985 (addition of lactams) and DE-OS No. 3,428,986 (addition of esters/anhydrides of carboxylic acids), in which water present in the reaction mixture is completely distilled out and the reaction is simultaneously controlled by the metered introduction of the reactants, proves to be advantageous for the production of the films of polyarylene sulphides according to the invention.

The reaction can be carried out in various ways:

The alkali metal sulphides are preferably used in the form of their hydrates and aqueous solutions. The dehydration can be partial but is preferably total. The water present in the reaction mixture is distilled out of the mixture. The distillation of the water can be carried out directly or with the aid of azeotrope formers, it being possible to use the dihalogen aromatic compounds as azeotrope formers. For the purpose of dehydration all of the reactants can be mixed and the dehydration of the total mixture can be carried out. It is also possible for the alkali metal sulphide to be dehydrated separately together with some of the reaction components, or independently.

In one embodiment of the reaction the reactants are continuously combined with the reaction accelerator or a mixture of reaction accelerators in the presence of the polar solvent with simultaneously removal of the water. In this method of procedure, once a reaction has begun it can be controlled by the feed rates. Using this method long residence times of the water can also be avoided.

If total dehydration is carried out the reaction can be effected without any pressure or under a low pressure of up to about 3 bars. To obtain higher reaction temperatures above the boiling point of the solvent or of the mixture of solvent and di- and polyhalogen aromatic compounds a higher pressure of up to 50 bars can be used.

The reaction can be carried out continuously and discontinuously. The reaction time can be varied within a wide range. It can be 1-48 hours, preferably 1-18 hours. The reaction temperatures are between 150° and 300° C., preferably between 170° and 280° C.

The working up of the reaction mixture and the isolation of the polyarylene sulphides can be carried out in a known manner.

The polyarylene sulphide can be separated from the creation solution by customary methods of procedure, for example by filtration or by centrifuging, either directly or after, for example, adding water and/or dilute acids or organic solvents with low solubility for polyarylene sulphides. After the polyarylene sulphide has been separated off it is then generally washed with water. Washing or extraction with other washing liquids, which can also be carried out additionally or subsequent to the aforementioned washing step, is also possible.

The polyarylene sulphide can also be isolated for example by distilling off the solvent and subsequently washing the product, as described above.

The alkali metal sulphides can for example also be obtained from $H_2S$ and the alkali metal hydroxides or from the hydrogen sulphides and alkali metal hydroxides.

Depending on the quantity of alkali metal hydrogen sulphide which is contained in the reaction solution as an impurity in the alkali metal sulphide specific quantities of alkali metal hydroxide can be additionally metered in. If appropriate, it is also possible to add, instead of the alkali metal hydroxides, compounds which split off or form alkali metal hydroxides under the reaction conditions.

The polyphenylene sulphides were produced from a. 50–100 mol % of dihalogen aromatic compounds of the formula

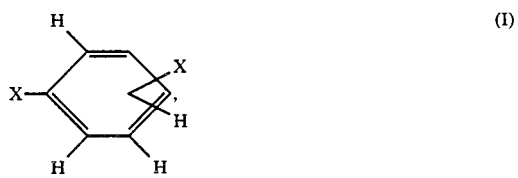

and 0–50 mol % of dihalogen aromatic compounds of the formula

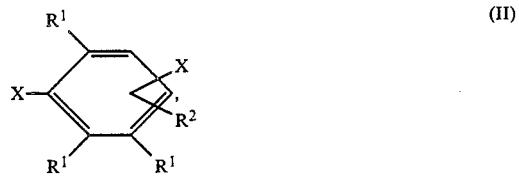

in which

X represents halogen, such as chlorine or bromine, which is in the meta or para position to the other halogen and $R^1$ and $R^2$ are identical or different and can be hydrogen, $C_1$–$C_4$-alkyl, $C_5$–$C_{10}$-cycloalkyl, $C_6$–$C_{10}$-aryl, $C_7$–$C_{10}$-alkylaryl and $C_7$–$C_{14}$-arylalkyl and b. alkali metal sulphides, preferably sodium or potassium sulphide or mixtures thereof, preferably in the form of their hydrates or aqueous mixtures, optionally together with small amounts of alkali metal hydroxides such as sodium and potassium hydroxide, and 0–50 mol % of alkali metal bisulphide, preferably sodium and potassium hydrogen sulphide, or mixtures thereof, it being possible for the molar ratio of (a+b): c to be in the range 0.75:1 to 1.25:1 and optionally in the presence of the abovementioned reaction accelerators.

In order to obtain thermoplastically processible polyphenylene sulphides p-dihalogen aromatic compounds are preferably used.

Examples of dihalogen aromatic compounds of the formula (I) to be used according to the invention are: p-dichlorobenzene, p-dibromobenzene, 1-chloro-4-bromobenzene, 1,3-dichlorobenzene, 1,3-dibromobenzene and 1-chloro-3-bromobenzene. They can be used independently or as mixtures with one another, 1,4-Dichlorobenzene and/or 1,4-dibromobenzene are preferred.

Examples of dihalogen aromatic compounds of the formula (II) to be used according to the invention are: 2,5-dichlorotoluene, 2,5-dichloroxylene, 1-ethyl-2,5-dichlorobenzene, 1-ethyl-2,5-dibromobenzene, 1-ethyl- 2-bromo-5-chlorobenzene, 1,2,4,5-tetramethyl-3,5-dichlorobenzene, 1-cyclohexyl-2,5-dichlorobenzene, 1-phenyl-2,5-dichlorobenzene, 1-benzyl-2,4-dichlorobenzene, 1-phenyl-2,5-dibromobenzene, 1-p-toyl-2,5-dichlorobenzene, 1-p-tolyl-2,5-dibromobenzene, 1-hexyl-2,5-dichlorobenzene, 2,4-dichlorotoluene,2,4-dichloroxylene, 2,4-dibromocumene and 1-cyclohexyl-3,5-dichlorobenzene. They can be used independently or as mixtures with one another.

In general any polar solvent which ensures adequate solubility of the organic and, if appropriate, inorganic reactants under the reaction conditions can be used for the reaction, N-alkyl lactams are preferably used.

N-alkyl lactams are those of amino acids with 3-11 C-atoms, which can optionally carry substituents on the carbon skeleton which are inert under the reaction conditions.

The following are for example used as the N-alkyl lactams:

N-methylcaprolactam, N-ethylcaprolactam, N-isopropylcaprolactam, N-isobutylcaprolactam, N-propylcaprolactam, N-butylcaprolactam, N-cyclohexylcaprolactam, N-methyl-2-pyrrolidone, N-ethyl-2-pyrrolidone, N-isopropyl-2-pyrrolidone, N-isobutyl-2-pyrrolidone, N-propyl-2-pyrrolidone, N-butyl-2-pyrrolidone, N-cyclohexyl-2-pyrrolidone, N-methyl-3-methyl-2-pyrrolidone, N-methyl-3,4,5-trimethyl-2-pyrrolidone, N-methyl-2-piperidone, N-ethyl-2-piperidone, N-isobutyl-2-piperidone, N-methyl-6-methyl-2-piperidone and N-methyl-3-ethyl-2-piperidone.

Mixtures of the abovementioned solvents can be used.

The melt viscosity is 50-5,000 Pa.s, preferably 100-3,000 Pa.s, at 306° C. and a shear stress of $10^2$ Pa; the viscosity is measured with an Instron rheometer 3250 which is equipped with a cone-plate system with a diameter of 20 mm.

The chromatography for the analytical determination of the molecular weights or molecular weight distribution can be carried out at various pressures of 1-10 bar.

The chromatographic determination is carried out at a temperature of from room temperature to 250° C.

Furthermore substances such as alkali metal halides, alkaline earth metal carboxylates, or phosphonium or ammonium compounds can be added to improve the accuracy of the measurement of the sample to be analysed.

The melt viscosities $\eta_m$ of the polymer melt are determined at 306° C. as a function of the shear stress (measured in Pa.s) with the aid of an Instron rotational viscosimeter. In the Instron rheometer the polymer is melted between a fixed plate and a rotatable cone and the torque of the cone is determined. From the torque, the angular velocity and the data of the apparatus the melt viscosity can be calculated as a function of the shear stress. By this method it is possible to determine the melt viscosity within a very wide range of $10^{-1}$ to $10^7$ Pa.s. This method has advantages over the measurement of the melt flow properties according to ASTM 12378-70, since the high flowout rates can only be measured with great difficulty at high melt flow values.

The extrusion of the polyarylene sulphides suitable according to the invention into films is carried out by customary extrusion methods, for example by using a so-called slot-die. The processing temperature is 5 to 100° C., preferably 10° to 50° C., above the melting point of the polymer.

The melt flowing out of the die is passed over a rotating roller heated to a maximum of 60° C., where it is cooled to temperatures below the crystallisation temperature of the polyarylene sulphides suitable according to the invention with such rapidity that amorphous films can be formed.

Then these films can be drawn in the solid state. This drawing can be carried out at room temperature and preferably at elevated temperatures.

The drawing should preferably be carried out with the formation of distinctly recognisable necking-in so that the resulting mono- or biaxially drawn films can acquire their superior strength.

The formation of necking-in can preferably be observed during the drawing step if the temperature at which the drawing is carried out is preferably below the glass transition temperature of the polyarylene sulphide.

The drawing process can also be influenced by the drawing rate. If the drawing rate is too high the film may tear. The maximum achievable drawing rate can be higher, the higher the temperature of the film is during drawing.

Thus, in order to produce mono- and biaxially drawn films of polyarylene sulphide as economically as possible the drawing is carried out at temperatures just below the glass transition temperature of the polyarylene sulphide suitable according to the invention.

The polyarylene sulphide may already crystallise during drawing, which can be detected by cloudiness of the previously transparent film. To complete the crystallisation it may be advantageous to temper the film while still under tension subsequent to the mono- or biaxial drawing process. The temperatures necessary for this tempering are 130° to 289° C., preferably 200° to 260° C. The duration of the tempering step is between 5 minutes and 2 hours, preferably between 10 and 30 minutes.

EXAMPLES

EXAMPLE 1

1,110 g of N-methylcaprolactam, 323,5 g of sodium sulphide hydrate (=2.45 mols of Na$_2$S), 24 g of 50% strength sodium hydroxide solution, 341.1 of 1,4-dichlorobenzene (=2.32 mols), 28.53 g of sodium acetate and 5.07 g of ε-aminocaproic acid (0.035 mol) are initially introduced, under nitrogen, into a 2 1 three-necked flask equipped with a thermometer, a stirrer and a column with a distillate-separator. The reaction mixture is heated slowly to the boil. Water is separated from the distilled azeotrope, consisting of water and p-dichlorobenzene, and p-dichlorobenzene is recycled into the reaction vessel. After 2 hours no more water can be detected either in the distillate or in the bottom product. The mixture is heated for a further 9 hours under reflux and the product is isolated in the form of a white fibre in the customary manner by precipitation in water, acidification, washing free of electrolytes with the aid of water, and drying. The characterisation is carried out by determining the melt viscosity;

$\eta_m = 3.6 \times 10^2$ (measured at $10^2$ Pa and 306° C.) and the weight average of the relative molecular weight $M_w = 68,000$.

EXAMPLE 2

The apparatus was as in Example 1. 1,110 g of N-methylcaprolactam, 323,5 g of sodium sulphide hydrate (=245 mols), 28.0 of 50% strength sodium hydroxide solution, 341.1 g of 1,4-dichlorobenzene (=2.32 mols), 30.2 g of N,N-dimethylacetamide (15 mol %) and 5.07 g (0.035 mol) of ε-aminocaproic acid. The reaction mixture is heated slowly to the boil. From the distilled azeotrope, consisting of water and p-dichlorobenzene, water is separated off and p-dichlorobenzene is recycled. After 2 hours no more water can be detected either in the distillate or in the bottom product. The mixtur is heated for a further 9 hours under reflux and the product is processed further in the same way as in Example 2.

$\eta_m = 300$ Pa.s (measured at $10^2$ Pa and 306° C.), weight average of the relative molecular weight: $M_w = 64,000$.

EXAMPLE 3

As in Example 1, except that 76.1 g (0.58 mol) of ε-aminocaproic acid and 344,6 g (2.61 mols) of sodium sulphide hydrate are used and combined with solutions of N-methylcaprolactam and p-dichlorobenzene and sodium sulphide hydrate and ε-aminocaproic acid with simultaneous dehydration. The mixture is reacted further and worked up as in Example 1.

$\eta_m = 1,900$ Pa.s (measured at $10^2$ Pa and 306° C.). Weight average of the relative molecular weight: $M_w = 109,000$.

EXAMPLE 4-6

The polyphenylene sulphides produced acording to Examples 4-6 are extruded, using a twin-screw extruder (ZSK 32), from a 400 mm wide slot die with a slot width of 0.6 mm at melt temperatures between 300° and 310° C. The melts flowing out of the die are taken off in the form of 350 mm wide and 0.5 mm thick films by means of a four-roller stand. Since the temperature of the first takeoff roller with which the polyphenylene sulphide melts come into direct contact is 30° C. amorphous films are obtained.

From these films sections with the dimensions 300×300 mm are fixed inside a drawing frame and then drawn at 75° C. first in the direction of extrusion and then transversely to the direction of extrusion, in a ratio of 1:5. The rate of the drawing is 6 cm/g. During both drawing processes the appearance of two parallel necking-in areas transversely to the respective direction of drawing can be observed which do not disappear until the end of the drawing processes.

After drawing, the films which had previously been transparent, were opaque. Their thickness is now only 0.04 mm.

Following the drawing process the films, which are still in the drawing frame, are each heated for 20 minutes to 260° C.

The subsequently measured mechanical properties of these films can be found in Table 1.

|  |  | Films of polyarylene sulphide according to Example | | |
|---|---|---|---|---|
|  |  | 1 | 2 | 3 |
| Tear resistance | longitudinal | 240 | 235 | 260 MPa |
|  | transverse | 210 | 212 | 245 MPa |
| Elongation at break | longitudinal | 1.0 | 0.9 | 1. |
|  | transverse | 1.2 | 1.1 | 1.3% |

Mechanical properties of the films produced according to the invention.
Film sections which were each heated to 240° C. for 2 hours display after-shrinkage of less than 0.3%.

Comparative example

A stirred 1 l autoclave was charged with 4.9 mols of sodium sulphide ($Na_2S;9H_2O$), 0.75 mol of sodium hydroxide, 4.0 mols of lithium acetate ($CH_3COOLi \times 2$- $H_2O$) and 2.00 ml of N-methyl-2-pyrrolidone. The mixture was heated to 200° C. over 2 hours with slow $N_2$-flushing, in order to distil off the water. Then the reactor was cooled to 170° C. and 5.0 mols of 1,4-dichlorobenzene and 0.01 mol of 1,2,4-trichlorobenzene were added. The resulting system was sealed under a nitrogen pressure of 4 kg/cm² and heated to 270° C. and kept at this temperature for 3 hours. The resulting powdery polymer was washed 5 times with hot water and then twice with acetone and then dried in a vacuum oven at 70° C.

The yield of poly-p-phenylene sulphide was 86%. It had a melt viscosity of 180 Pa.s at 306° C. and 100 Pa. This polyphenylene sulphide was extruded, under the conditions mentioned in Examples 4-6, into an amorphous film of a width of 350 mm and a thickness of 0.5 mm. The consecutive drawing of film sections of the dimensions 300×300 mm was not possible either in the direction of extrusion or tranversely thereto at 75° C. without the films breaking and even at very low drawing speeds (1 cm/sec). It was only possible to draw these films at 95° C., although no necking-in were areas observed and the films remained transparent.

Following biaxial drawing in a ratio of 1:5 in each direction of drawing the films still in the drawing frame were also heated for 20 minutes to 260° C.

The subsequently measured mechanical properties of the biaxially drawn comparative films are contained in table 2. They show that the films drawn at a temperature higher than the glass transition temperature of the polyphenylene sulphide have considerably lower strengths even after tempering and undergo far greater deformation under stress.

TABLE 2

| Films according to the comparative example | | |
|---|---|---|
| Tear resistance | longitudinal | 150 MPa |
|  | transverse | 130 MPa |
| Elongation at break | longitudinal | 35% |
|  | transverse | 45% |

We claim:

1. Film of polyphenylene sulphide wherein the polyarylene sulphide is uncured and has a melt viscosity of 20 to 5,000 Pascal-seconds, a relative molecular weight $M_w$(rel) of 25,000 to 500,000 and wherein the melt viscosity $\eta_m$ and molecular weight $M_w$(rel) are correlated according to the following expression:

$$\lg \eta_m = 3.48 \cdot \lg M_w(rel) - 14.25 \pm 0.1,$$

said film has been drawn at a temperature below the glass transition temperature of the polyarylene sulphide first in the direction in which the film was extruded from a melt and then in the direction tranverse to the direction of extrusion in a ratio of about 1:5 at a rate of about 6 cm/g and then, while still under tension the film has been tempered at 130° to 280° C. for 5 minutes to 2 hours.

2. Film according to claim 1, wherein the $\eta m$ and $M_w$ (rel) are as follows:

$$\lg \eta_m = 3.48 \cdot \lg M_w(rel) - 14.25 \pm 0.05.$$

3. Film according to claim 1, characterised in that the polyarylene sulphide is produced in an N-alkyl lactam.

4. Film according to claim 1, characterised in that the polyarylene sulphide is produced in N-methylcaprolactam.

* * * * *